United States Patent Office 3,575,930
Patented Apr. 20, 1971

3,575,930
POLYOXYMETHYLENE GLYCOL POLYMERS
Kornelius Dinbergs, North Royalton, Ohio, assignor to The B. F. Goodrich Company, New York, N.Y.
No Drawing. Continuation-in-part of application Ser. No. 517,126, Dec. 28, 1965. This application Dec. 12, 1968, Ser. No. 783,416
Int. Cl. C08g 22/14
U.S. Cl. 260—67
6 Claims

ABSTRACT OF THE DISCLOSURE

Low molecular weight polyoxymethylene glycols including low molecular weight paraformaldehyde are reacted with excess organic diisocyanate in solution to form isocyanate terminated materials. The products are moldable, have good tensile properties and storage life, and they can be converted to polyurethane materials by reaction with diols or amines.

CROSS REFERENCE TO RELATED APPLICATIONS

This application is a continuation-in-part of application Ser. No. 517,126 filed Dec. 28, 1965, now abandoned.

BACKGROUND OF THE INVENTION

Formaldehyde, HCHO, is the simplest member of the aldehyde series of chemicals. It exists in the gaseous state and is available as a 37 weight percent solution in water known as Formalin. Anhydrous formaldehyde does not polymerize. Formaldehyde containing 1 mol of combined water is known as methylene glycol and has the formula

which can also be written as $HO(CH_2O)H$. In this form the material forms a series of solid polymers including (1) low molecular weight polyoxymethylene glycol, $HO(CH_2O)_nH$ where $n$ equals to 2 to 8, (2) paraformaldehyde, which is a mixture of polyoxymethylene glycols, $HO(CH_2O)_nH$, where $n$ equals 8 to 100, and (3) alpha-polyoxymethylene glycol $HO(CH_2O)_nH$ where $n$ is 100 or greater. Despite the nomenclature employed, paraformaldehyde is not an aldehyde (aldehydes chemically have terminals =CHO groups); it is an hydroxyl terminated linear chain compound. The high molecular weight polyoxymethylene glycols (inherent viscosity 1.3–2.2) with a number average molecular weight of 40,000–150,000 determined by osmometry have hardness and resistance to organic solvents comparable to those of metals. Polyoxymethylene glycols with number average molecular weights below about 40,000 are brittle and have poor physical properties. Low molecular weight polyoxymethylene glycols and paraformaldehyde of the formula $HO(CHO)_nH$ where $n$ is is 2 to 64 are also hydroxy-terminated polymers and have very poor physical properties. These low molecular weight materials find their main use in being solid state sources of substantially anhydrous monomeric formaldehyde. They are readily depolymerized by heat. It will be of value to the art to have a process for converting low molecular weight polyoxymethylene glycol and low molecular weight paraformaldehyde into linear polymers that have properties and usefulness comparable to the high molecular weight polyoxymethylene glycols.

The degree of polymerization and the corresponding molecular weight for low molecular weight (below about 3000) polyoxymethylene glycols is determined by the formaldehyde content thereof based on formaldehyde analysis as described in Formaldehyde, J. Frederic Walker, Third Edition, Reinhold Publishing Corporation (1964) pages 502–503. Polymers with a low degree of polymerization, where $n$ in the formula $HO(CH_2O)_nH$ is 2–8 are soluble in acetone and ether. Where $n$ is in the range 8–12, the polymer is soluble in hot acetone. Where $n$ is in the range 12–64, the polymer is soluble in boiling dioxane.

It has been discovered that low molecular weight polyoxymethylene glycols including low molecular weight paraformaldehyde, specifically said materials which are soluble in boiling dioxane, can be reacted in solution with an excess of a diisocyanate to give new isocyanate-capped materials. An excess of diisocyanate must be used to accomplish the reaction with the terminal hydroxyl groups of the low molecular weight formaldehyde polymers before said polymers decompose to water and formaldehyde, a reversion that occurs at temperatures as low as room temperature. Only the low molecular weight polyoxymethylenes mentioned, with the formula $$HO(CH_2O)_nH$$

where $n$ is an integer from 2 through 64, are subjects of this invention. The higher molecular weight range of paraformaldehyde, $HO(CH_2O)_nH$ where $n$ ranges from about 65–100, is not soluble in boiling dioxane and does not react successfully in the practice of the invention. Polyacetals, which are prepared by the reaction of an aldehyde with an alcohol, are not useful materials in this invention.

To obtain the reaction required by the invention, there must be contact between the hydroxyl groups of the polyoxymethylene glycol and the isocyanate groups of the diisocyanate. This contact is not possible unless the polymer is in solution. One might expect to run a melt reaction of the polymer and diisocyanate, but this is not possible where low molecular weight polyoxymethylene glycols are used, because these polymers decompose very rapidly at the melting point. They normally are melted in sealed tubes only. The reaction is therefore run in solution and the solvent, of course, must be inert to isocyanate. Dioxane is the preferred solvent. Low molecular weight polyoxymethylene glycol and that portion of paraformaldehyde which is low enough in molecular weight to be soluble in dioxane at its boiling point can be successfully capped with isocyanate termination by reaction in an anhydrous system.

These new isocyanate-capped, low molecular weight formaldehyde polymers have distinct advantages over the initial hydroxyl terminated materials. They are moldable, whereas the uncapped materials are not moldable. They are stable, and maintain their superior properties even after long periods of shelf storage. Finally, the reactive terminal isocyanate groups give means of chain-extending, branching, and cross-linking the polymer as with diols or amines to form polyurethanes. These new chain-extended polymers are found to be comparable in properties to high molecular weight polyoxymethylene glycol, $HO(CH_2O)_nH$ where $n$ is 1300 or more.

Paraformaldehyde with a molecular weight range of about 260 to 3020 is commercially available. For use in the practice of this invention, it must be free of absorbed water, a condition that is readily achieved by azeotropic distillation of the dioxane solution with benzene. Only that portion of paraformaldehyde which has a molecular weight of 1938 and below, and which is the portion found to be soluble in boiling dioxane, is useful in this invention.

The organic diisocyanates employed in excess to form isocyanate-terminated paraformaldehyde are preferably aromatic diisocyanates. Diphenyl diisocyanates are most preferred. Typical materials of this type include diphenyl methane diisocyanate, diphenyl methane-p,p'-diisocyanate, diphenyl dimethyl methane diisocyanate, bibenzyl diisocyanate, and diphenyl ether diisocyanate.

Diols useful for chain extending isocyanate-capped paraformaldehyde into polyurethanes include free glycols such as straight chain glycols containing between 4 and 10 carbon atoms, for example, butanediol-1,4, hexamethylene diol-1,6, octamethylene diol-1,8, and the like. The glycol is preferably of the formula $HO(CH_2)_xOH$ wherein $x$ is 4 to 8. The preferred glycol is butanediol-1,4. Amines useful for chain extension include primary and secondary diamines, such as phenylene diamine, diphenylmethane diamine, piperazine, and hexamethylene diamine. The extender must be soluble in dioxane or other solvent employed in conducting the reaction.

DETAILED DESCRIPTION

The following examples will serve to illustrate the invention. Parts given are parts by weight unless otherwise stated.

Example 1

Paraformaldehyde (200 grams) is boiled for one minute in 1800 grams of dioxane to separate the low average number molecular weight, 1938 and below, dioxane soluble fraction. Undissolved higher molecular weight material is filtered off, leaving 1900 grams of solution. Benzene (400 ml.) is added and 216 ml. of benzene-water azeotrope is removed. Four hundred eighty grams of 4,4'-diphenyl methane diisocyanate are added and the mixture is heated at 90°–92° C. for 6 hours. An isocyanate-terminated polymer is formed by the reaction and is filtered, washed with dry toluene and dried under vacuum giving a yield of 84 grams. The polymer analyzes 4.66% NCO, 5.33% N, 40–50% HCHO.

Micro dumbbell samples .025 inch thick are molded at various temperatures to form flexible sheets with the following properties:

| | Conditions | | | | |
|---|---|---|---|---|---|
| | Molding temperature, °C. | Warmup, min. | Mold, min. | Tensile, p.s.i. | Elongation percent |
| Sample: | | | | | |
| A | 150 | 4 | 5 | 5,800 | 25 |
| B | 160 | 4 | 5 | 6,700 | 25 |
| C | 165 | 4 | 5 | 6,600 | 25 |
| D | 165 | 4 | 5 | *2,000 | 25 |
| E | 170 | 3 | 5 | 7,000 | 25 |
| F | 180 | 3 | 5 | 6,900 | 25 |

*After one week aging in weatherometer, color change from clear transparent to light, brown, transparent.

The notched Izod impact strength of a sample molded 5 minutes at 170° C. (4 minutes warmup) is 1.07 ft. lb./in. Methylmethacrylate polymers have Izod values of 0.3 to 0.5; polystyrenes, 0.25–0.6; nylon 6/6, 1.0.

A portion of the isocyanate-capped polyoxymethylene glycol was stored for 15 months in a stoppered glass tube at room temperature. After this extended period, a 2.4 gram sample was shaped in a micromold by warming 4' and molding 5' at 165° C. A flexible, bubble-free yellow sheet formed. It had 6400 p.s.i. tensile and 25% elongation. The paraformaldehyde from which this material is prepared by the practice of this invention is not moldable at all and cannot be stored under these conditions without partially decomposing to formaldehyde and water.

Example 2

The procedure of Example 1 is followed using toluene diisocyanate in place of 4,4'-diphenyl methane diisocyanate. A sample of the polymer is molded at 165° C. for 5 minutes after a 4 minute warmup. A satisfactory sheet with no formaldehyde odor is produced.

Example 3

In a 2-liter, 3-necked flask equipped with stirrer, thermometer and distilling head, 950 grams dioxane and 400 ml. benzene are heated and 340 ml. of benzene-water azeotrope are driven off to dry the solvent. The distillation head is replaced with a condenser and 30.0 grams of the isocyanate-capped polymer prepared in Example 1, 16.6 mmole based on the NCO analysis, and 1.50 grams butanediol-1,4 (16.6 mmole) are added. The mixture is reacted for 7 hours at 85°–95° C. The filtered polymer is washed in dry toluene and vacuum dried. When molded 5 minutes at 180° C. after a 4 minute warmup, the polyurethane forms flexible, light yellow sheets with 6000 p.s.i. tensile and 25% elongation.

I claim:
1. An isocyanate-terminated polymer of polyoxymethylene glycol of the formula $HO(CH_2O)_nH$ wherein $n$ is an integer from 2–64, said polyoxymethylene glycol being characterized by its solubility in boiling dioxane, said polymer being prepared by reacting said polyoxymethylene glycol in solution in dioxane with an excess of an aromatic diisocyanate selected from the group consisting of diphenyl methane diisocyanate, diphenyl methane - p,p' - diisocyanate, diphenyl dimethyl methane diisocyanate, bibenzyl diisocyanate and diphenyl ether diisocyanate.

2. The isocyanate-terminated polymer of claim 1 wherein the polyoxymethylene glycol of the formula $HO(CH_2O)_nH$ wherein $n$ is an integer from 2–64 is separated from polyoxymethylene glycol of the formula $HO(CH_2O)_nH$ wherein $n$ is an integer from 65 to 100 by the solvent action thereon of boiling dioxane.

3. A polyurethane comprising the reaction product of equimolar quantities of the isocyanate-terminated polyoxymethylene glycol of claim 1 and a chain-extending material selected from the class consisting of aliphatic straight chain diols containing between 4 and 10 carbon atoms and primary and secondary amines selected from the group consisting of phenylene diamine, diphenylmethane diamine, piperazine and hexamethylene diamine, the reaction to produce said product being run for 7 hours in the temperature range of 85°–95° C.

4. The polyurethane of claim 3 comprising the reaction product of equimolar quantities of the said isocyanate-terminated polyoxymethylene glycol and butanediol-1,4, said reaction being run for 7 hours in the temperature range of 85°–95° C.

5. The method of reacting polyoxymethylene glycol of the formula $HO(CH_2O)_nH$ wherein $n$ is an integer from 2–64 with an excess of an aromatic diisocyanate selected from the group consisting of diphenyl methane diisocyanate, diphenyl methane - p,p' - diisocyanate, diphenyldimethyl methane diisocyanate, bibenzyl diisocyanate, and diphenyl ether diisocyanate in a dioxane system whereby to form an isocyanate-capped polyoxymethylene glycol.

6. The method of reacting equimolar amounts of the isocyanate-capped polyoxymethylene glycol of claim 5 and a chain-extender selected from the class consisting of straight chain glycols containing between 4 and 10 carbon atoms and primary and secondary amines selected from the group consisting of phenylene diamine, diphenylmethane diamine, piperazine, and hexamethylene diamine in dioxane for 7 hours at 85°–95° C.

References Cited

UNITED STATES PATENTS 3,136,830    6/1964    Oertel et al. ———— 260—67TN

WILLIAM H. SHORT, Primary Examiner

L. M. PHYNES, Assistant Examiner

U.S. Cl. X.R.

260—77.5, 615.5